Jan. 6, 1948.   S. J. HINES   2,433,952
SAFETY PARACHUTE
Filed Oct. 23, 1943   2 Sheets-Sheet 1

Samuel J. Hines,
INVENTOR.

BY
Victor J. Evans & Co.
ATTORNEYS

Jan. 6, 1948.  S. J. HINES  2,433,952
SAFETY PARACHUTE
Filed Oct. 23, 1943  2 Sheets-Sheet 2

Samuel J. Hines,
INVENTOR.

BY
Victor J. Evans & Co.
ATTORNEYS

Patented Jan. 6, 1948

2,433,952

UNITED STATES PATENT OFFICE 2,433,952

SAFETY PARACHUTE

Samuel J. Hines, Alexandria, La.

Application October 23 1943, Serial No. 507,421

2 Claims. (Cl. 244—139)

My invention relates to aircraft, and has among its objects and advantages the provision of an improved safety parachute designed to bring the aircraft down in safety in the event of engine trouble or other damage to the aircraft.

Figure 1:
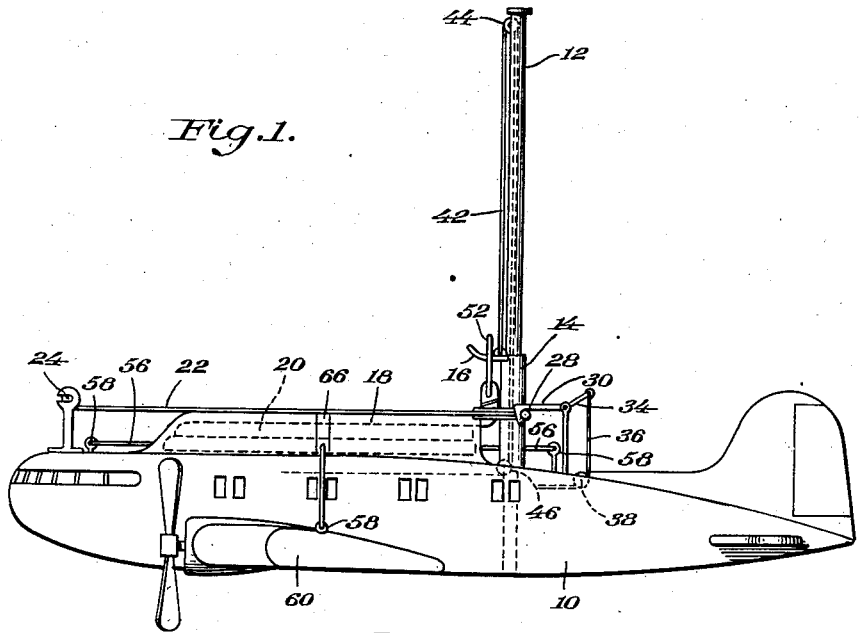
Figure 1 is a side view of a plane equipped with my invention, with the parachute folded.
Figure 2:
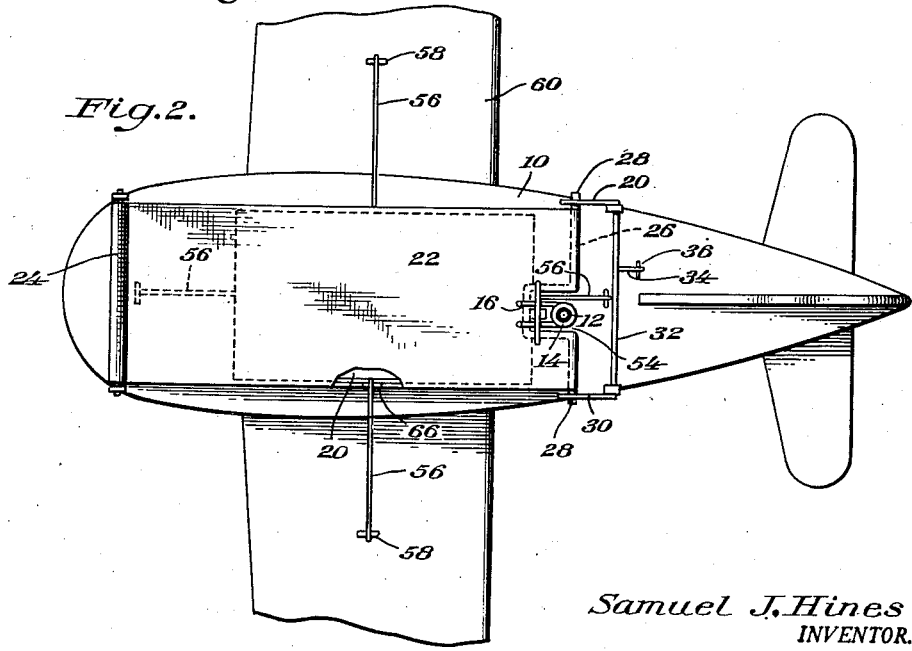
Figure 2 is a top view.

In the embodiment of the invention selected for illustration, the airplane fuselage 10 is provided with an upstanding pipe 12 having a sleeve 14 slidably mounted thereon and provided with lifting hooks 16. Forwardly of the tube 12 is located a box or enclosure 18 open at its top for containing the folded parachute 20.

The box 18 is normally covered by a curtain 22 having one end attached to a spring operated roller 24. The free end of the curtain is provided with a reinforcing rod 26 extending beyond the side edges of the curtain to provide pins 28. These pins are normally engaged by hooks 30 fixed to a rotatably mounted shaft 32.

An arm 34 is attached to the shaft 32 and is connected with a pull line 36 passing around a grooved wheel 38 and connected with a lever 40. Thus the curtain 22 may be released by pivoting the lever 40 to swing the hooks 30 out of holding engagement with the pins 28, to allow the curtain to be wound on the roller 24.

Means for lifting the parachute 20 from the box 18 comprise a pull line 42 passing around a grooved wheel 44 located at the upper end of the tube 12. One part of the line runs downwardly through the tube and passes around a grooved wheel 46 and forwardly for connection with a rotatable drum 48 which may be turned by a crank 50. The other end of the line 42 connects with the sleeve 14 for elevating the hook 16, the latter being normally inserted through a ring 52 attached to the apex of the parachute 20. A recess 54 is provided in the free end of the curtain 22 to provide accommodation for the tube 12, as well as the hook 16.

Holding lines 56 are connected with the parachute 20 and attachments 58 connected with the fuselage 10 and the wings 60. Short lines 62 connect the parachute 20 with a cross line 64 encircling the lines 56. Slots 66 are provided in the box 18 for accommodating the lines 56 when the parachute is folded in the box 18.

Figures 3, 4:
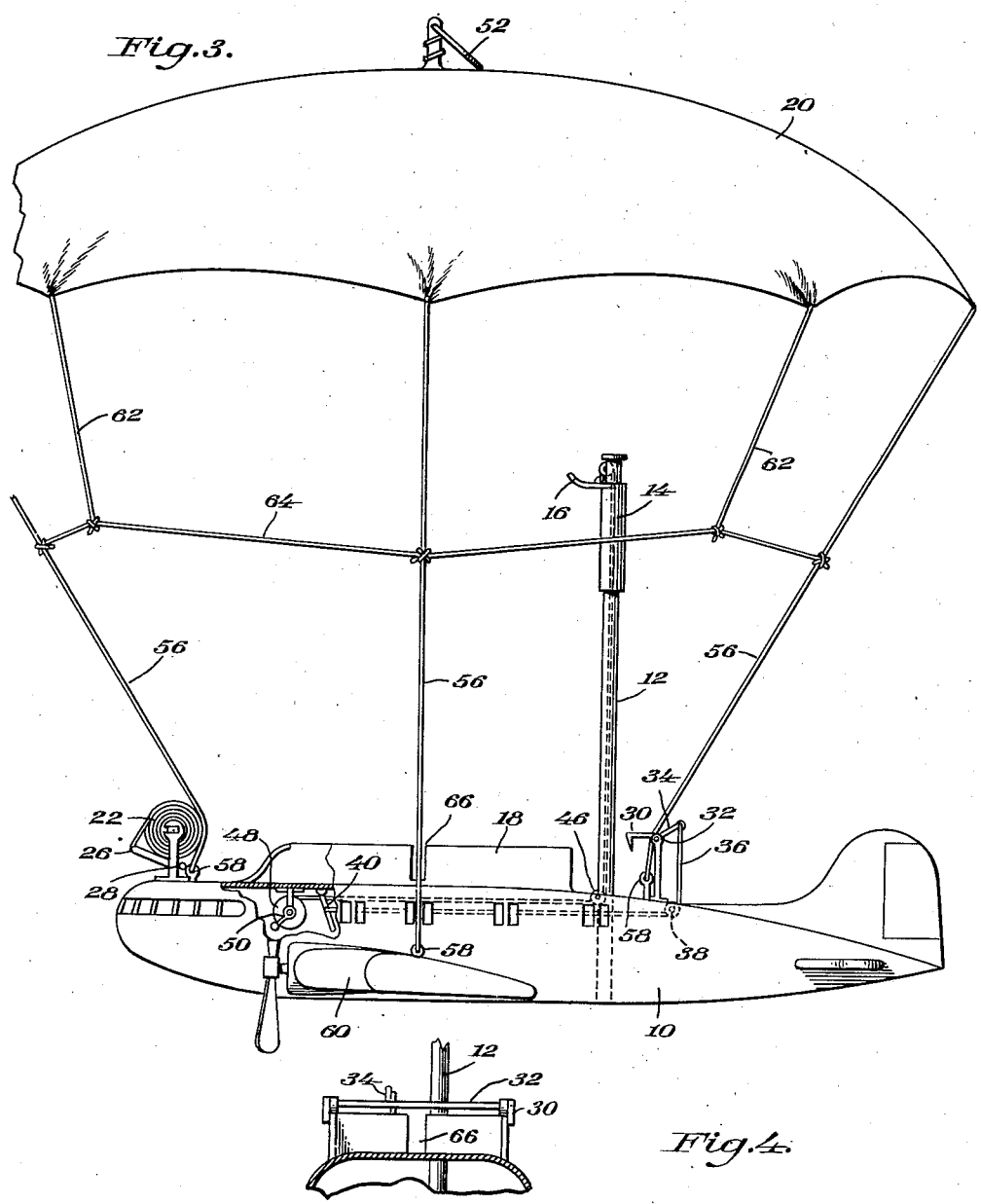
Figure 3 is a view similar to Figure 1, but illustrating the parachute released from its folded position.
Figure 4 is a sectional detail view.

Elevation of the hook 16 imparts a lift to the parachute 20 for bringing the latter out of the box 18 and releasing the parachute for operating purposes, as in Figure 3.

Without further elaboration, the foregoing will so fully explain my invention, that others may, by applying current knowledge, readily adapt the same for use under various conditions of service.

I claim:

1. In an aircraft, the combination of a box open at its top with a normally folded parachute in said box, lines connecting the parachute with the aircraft, a vertical shaft mounted on the aircraft adjacent the box between the connecting lines remote from said box, a sleeve having a hook member vertically movable on the upstanding shaft, an eye carried by the upper outer face of said parachute in engagement with the hook, a spring biased curtain normally closing the open top of said box extending longitudinally of said airplane, a shaft having diametrically opposed hook means thereon for releasably holding said curtain in closed position and a pull line operatively connected with said sleeve whereby the parachute is raised vertically until partly unfolded and the air continues the upward movement of the parachute and lifts it from the hook a cutout portion in the end of said curtain to receive said shaft and permit movement of the sleeve on said shaft and a rod in the end of the curtain conforming to the shape of said cutout and providing means for receiving said hook means for holding said curtain.

2. In an aircraft, the combination of a box having an outlet opening with a normally folded parachute in said box, lines connecting the parachute with the aircraft at points outside of the box, a vertical shaft mounted on the aircraft adjacent the box between the connecting lines and remote from said box, a spring biased curtain normally closing the outlet opening of said box, said curtain extending longitudinally of said aircraft, a shaft having diametrically opposed hook means thereon for releasably holding said curtain in closed position and means for operating said shaft to release said curtain, a sleeve mounted on the shaft, means for moving the sleeve vertically on the shaft, a hook carried by the sleeve, and an eye carried by the upper outer face of the parachute in engagement with the hook for partially raising the parachute from its folded position to allow the air to complete the unfolding thereof a cutout portion in the end of said curtain to receive said shaft and permit movement of the sleeve on said shaft and a rod in the end of the curtain conforming to the shape of said cutout and providing means for receiving said hook means for holding said curtain.

SAMUEL J. HINES.

REFERENCES CITED

The following references are of record in the file of this patent:

UNITED STATES PATENTS

| Number | Name | Date |
|---|---|---|
| 1,011,683 | Webb | Dec. 12, 1911 |
| 1,509,032 | Scalisi | Sept. 16, 1924 |
| 1,024,407 | Lewis | Apr. 23, 1912 |
| 1,077,114 | Baker | Oct. 28, 1913 |
| 1,410,435 | Whaley | Mar. 21, 1922 |
| 1,039,295 | Kratofill | Sept. 24, 1912 |
| 1,262,834 | Norberti | Apr. 16, 1918 |